United States Patent [19]

Krempel

[11] Patent Number: 4,607,549

[45] Date of Patent: Aug. 26, 1986

[54] EXCHANGEABLE TURNING HEAD, PARTICULARLY A FACE TURNING HEAD

[75] Inventor: Fritz Krempel, Epfendorf, Fed. Rep. of Germany

[73] Assignee: Mauser-Werke Oberndorf GmbH, Fed. Rep. of Germany

[21] Appl. No.: 606,371

[22] Filed: May 2, 1984

[30] Foreign Application Priority Data

May 7, 1983 [DE] Fed. Rep. of Germany ....... 3316867

[51] Int. Cl.$^4$ ........................................... B23B 29/034
[52] U.S. Cl. ....................................... 82/2 E; 82/1.2; 82/63
[58] Field of Search ............... 408/161, 162, 165, 168, 408/153, 171; 82/1.2, 1.3, 1.4, 2 E, 2 A, 63

[56] References Cited

U.S. PATENT DOCUMENTS

| | | | |
|---|---|---|---|
| 3,208,312 | 9/1965 | Heuser | 82/1.2 |
| 3,824,883 | 7/1974 | Wloszek | 82/1.2 |
| 4,040,315 | 8/1977 | Bellingham | 82/2 E |
| 4,184,391 | 1/1980 | Eckle | 82/1.2 |
| 4,432,258 | 2/1984 | Currer | 82/1.2 |
| 4,489,629 | 12/1984 | D'Andrea et al. | 82/1.2 |

FOREIGN PATENT DOCUMENTS

| | | | |
|---|---|---|---|
| 1652658 | 4/1971 | Fed. Rep. of Germany | 82/1.2 |
| 2731860 | 11/1978 | Fed. Rep. of Germany | 82/1.2 |
| 766758 | 10/1980 | U.S.S.R. | 82/1.2 |

Primary Examiner—Lowell A. Larson
Assistant Examiner—Jerry Kearns
Attorney, Agent, or Firm—McGlew and Tuttle

[57] ABSTRACT

A face turning head for machining stations, comprises a drive mechanism for displacing the tool slide transversely. A drive shaft drives a worm gear or its equivalent through a transmission element, such as a cog belt transmission to axially displace a setting rod. This axial movement of the setting rod, which is independent of the rotation of the turning head but can be effected simultaneously therewith, actuates a gib key drive by which a tool slide is displaced transversely to the turning head axis. Through reversing rollers and displaceable blocks, the centrifugal disequilibrium caused by the tool slide movement is compensated for.

6 Claims, 7 Drawing Figures

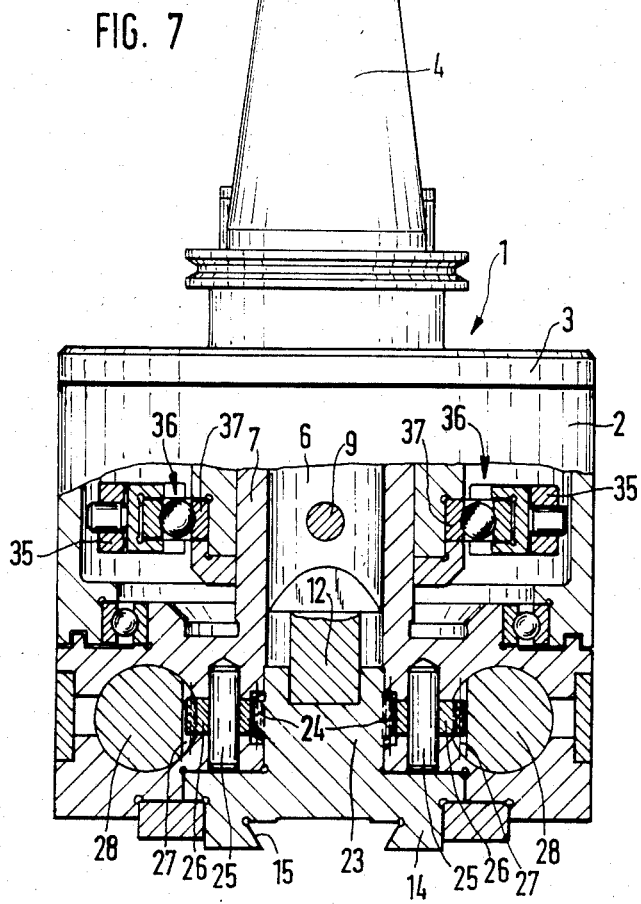

4,607,549

EXCHANGEABLE TURNING HEAD, PARTICULARLY A FACE TURNING HEAD

FIELD AND BACKGROUND OF THE INVENTION

This invention relates in general to turning machines and in particular to a new and useful turning head particularly a face turning head in which centrifugal forces are balanced.

German AS No. 16 52 658 discloses a face turning and drill head for a rotating tool, comprising a planetary gear for displacing a slide transversely to the drill head axis, in both directions. The feed motion and retraction of the slide is manually adjusted, with the drill head running. A manually actuated setting shaft with a helical gear drives, through worm or bevel gears, a threaded spindle by which the tool slide is transversely displaced by means of an engaging projection. What is disadvantageous in this prior art mechanism are the numerous transmission elements making the run of the turning head noisy, which unfavorably affects the surface quality of workpieces. The many movable elements and parts require an extreme precision in manufacture to eliminate undue tolerances, and moreover, the moving parts are considerably heated during the operation.

Just in machining stations, NC turning machines, drill head change centers, multi-spindle heads, and thread cutting machines, a turning head, and particularly a face turning head, is needed having none of the prior art drawbacks.

SUMMARY OF THE INVENTION

The invention is directed to a turning head having a small number of parts, backlash-free guideways, minimum play within tolerances obtained in an inexpensive way, and a well balanced run.

In accordance with the invention, a turning head, particularly a face turning head for a spindle of a mechine tool comprises a supporting body adapted to be secured to the spindle and a drive mechanism for displacing a slide transversely to the axis of the turning head independently of the rotary motion thereof. For this purpose a setting rod is axially displaceable and rotatable in a bore of the rotating part and it drives a tool slide transversely backwardly and forwardly as it is rotated independently of the rotating part from a shaft extending parallel to the axis of the rotating part. In accordance with the invention the drive of the slide is also effective to shift one or more block members in directions opposite to the slide movement direction during rotation so as to compensate for centrifugal forces.

A turning head of this design comprises only a small number of relatively simple component parts. The drive is transmitted by a single transmission element. The drive of the slide by means of a gib head key is the simplest displacement. The setting rod is taken along in rotation by a simple bolt fitted in a transverse bore. The setting rod rotates the tool slide through the gib key, which therefore serves two purposes at the same time.

In accordance with the invention the setting rod is mounted so that it may be displaced axially as well as rotated. This is effected by connecting the rod with a cross member mounted on a rotatable bearing so as to permit the slide upwardly and downwardly as well as rotated. The rotatable part of the bearing is driven from a separate shaft extending parallel to the axis of the rotatable part through a driving mechanism which is the equivalent of the worm gear. The slide is moved transversely by a key gib which is formed as an extension of the rod setting member and extends to an oblique slot of a transversely movable tool slide. The tool slide has a gear connection to two separate block members which are arranged on respective sides of the rod so that the block members are driven in opposite directions to the tool slide as the slide is moved.

Accordingly it is an object of the invention to provide an improved turning head having means for compensating for centrifugal forces during the movement of a tool slide.

A further object of the invention is to provide a turning head which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a sectional view taken along the line VII—VII of FIG. 5.

DESCRIPTION OF THE PREFERRED EMBODIMENTS

Figure 1:
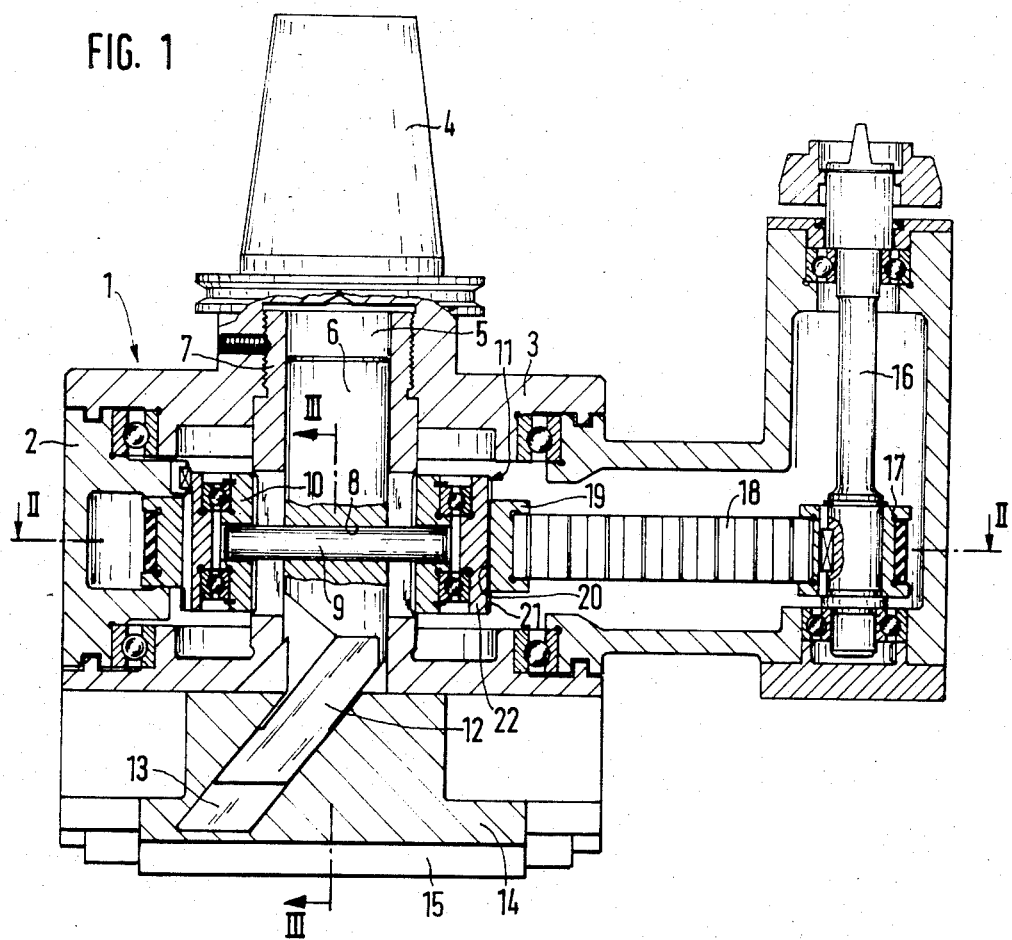
FIG. 1 is a sectional view of a face turning head comprising a drive mechanism for transversely displacing a tool slide.
Figure 2:
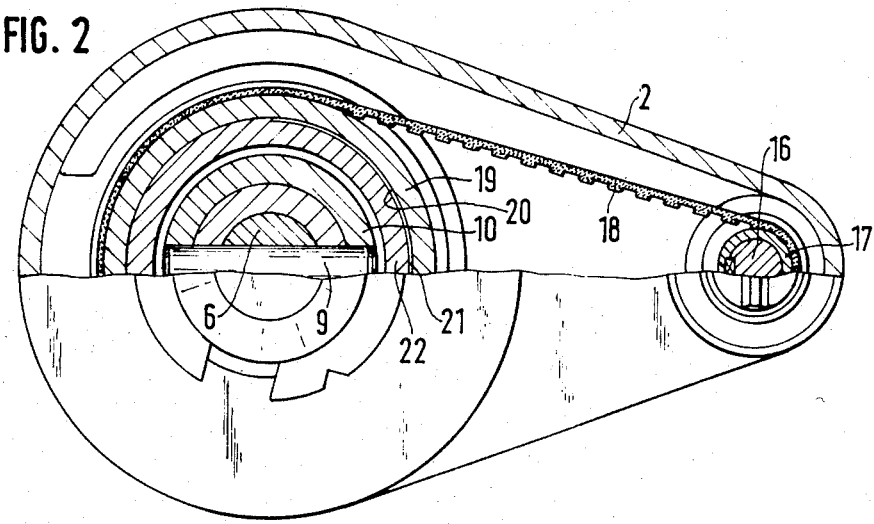
FIG. 2 is a sectional view of the drive mechanism, taken along the line II—II of FIG. 1.

Referring to the drawings, in particular the invention embodied therein comprises a turning head particularly a face turning head for a spindle of a machine tool which comprises a rotating part 3 of the face turning head 1 as shown in FIG. 1 and having a housing 2 firmly secured to a part of a machine tool. A rotary part 3 of the turning head 1 is non-rotatably connected to the spindle of the machine through a conical intermediate piece 4. Coaxially with the spindle of the machine and the conical intermediate piece 4, a setting rod 6 is received in a central bore 5 of a sleeve 7 pinned thereto which rotates along with rod 6 and rotary part 3. In a cross bore 8 of setting rod 6, a bolt 9 is fitted whose two ends projecting from cross bore 8 establish a connection with the inner bearing shell 10 of an antifriction bearing 11. The rotary motion of the machine spindle (not shown) is thus transmitted through conical intermediate piece 4, rotary part 3, inner bearing shell 10 of antifriction bearing 11, and the bolt 9, to the setting rod 6. On its foot position, setting rod 6 carries a gib key 12 which is slidably inserted in a precision keyway 13 provided in tool slide 14 and extending obliquely to setting rod 6. Precision keyway 13 also extends parallel to tool holder guideway 15. Due to the gib key 12 connection, a tool slide 14 rotates in synchronism with setting rod 6.

The tool slide 14 is displaced transversely independently of the rotation of the turning head, a drive shaft 16 is mounted carrying a pinion 17 firmly secured thereto and driving a cog belt 18. Cog belt 18 is trained around an output wheel 19 having internal helical teeth 20 meshing with external helical teeth 21 of the outer bearing shell 22 of antifriction bearing 11, thus forming a worm gear equivalent. Now, rotation of shaft 16 produces a rotation of output wheel 19 in the same direction and, due to the interposed worm gear, outer bearing shell 22 of antifriction bearing 11 is displaced axially upwardly or downwardly. Along with outer bearing shell 22, inner bearing shell 10 of antifriction bearing 11 is moved axially, since the two bearing shells are secured to each other. Through bolt 9, the axially moving antifriction bearing 11 moves setting rod 6 in the same direction, so that gib key 12 is moved upwardly or downwardly. All these axial movements take place independently of the rotary motion of turning head 1 and, of course, may take place simultaneously. The sliding of gib key 12 up and down, perpendicularly to tool slide 14, displaces the tool slide transversely.

Figure 3:
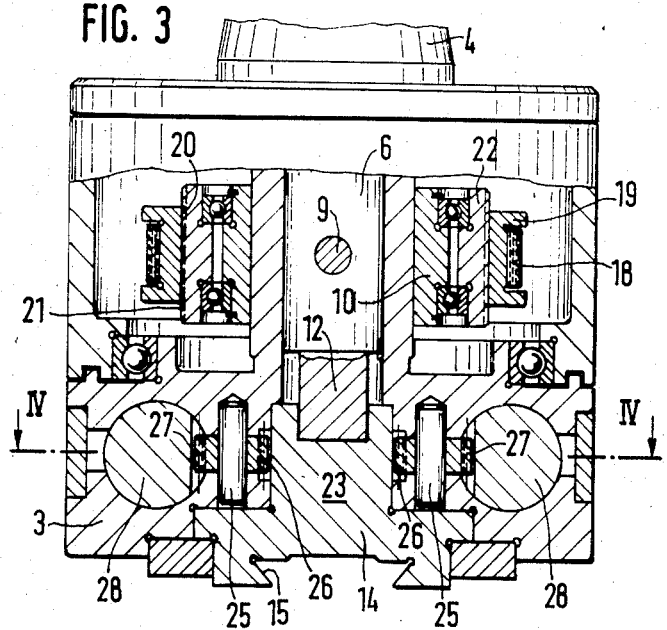
FIG. 3 is a sectional view of the setting rod and the jib key drive, taken along the line III—III of FIG. 1.
Figure 4:
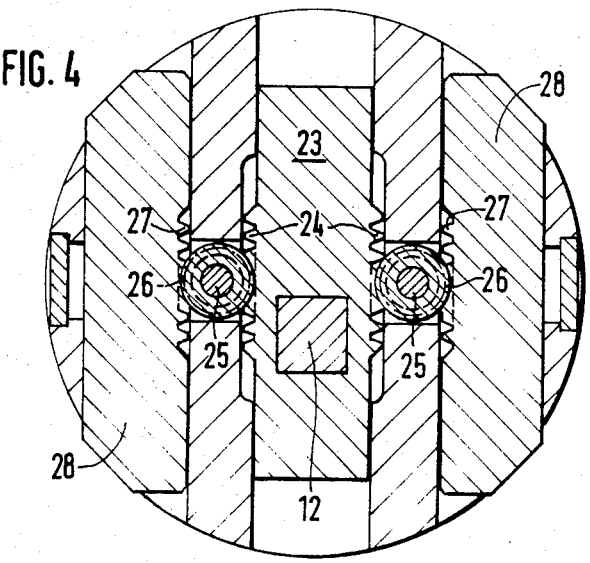
FIG. 4 is a sectional view of the tool slide and the blocks for centrifugal balancing, taken along the line IV—IV of FIG. 3.

FIGS. 3 and 4, show how the inventive turning head is equipped for balancing rhe centrifugal forces. A projecting stud portion 23 facing setting rod 6, of tool slide 14 and extending parallel to tool holder guideway 15 is provided on its two straight longitudinal sides with teeth 24 engaging at either side a pinion 26 which is mounted through a pin 25 in rotary part 3. Each pinion 26 meshes on the other side with another straight row of teeth 27 provided on balancing blocks 28 extending parallel to tool holder guideway 15 and movable to compensate for the centrifugal forces. Through the interposition of pinions 26, a transverse movement of tool slide 14 in one direction causes a movement of blocks 28 in the opposite direction, so that the masses become equilized, the run is quiet, and the surface quality of the machined workpiece is improved.

Figure 5:
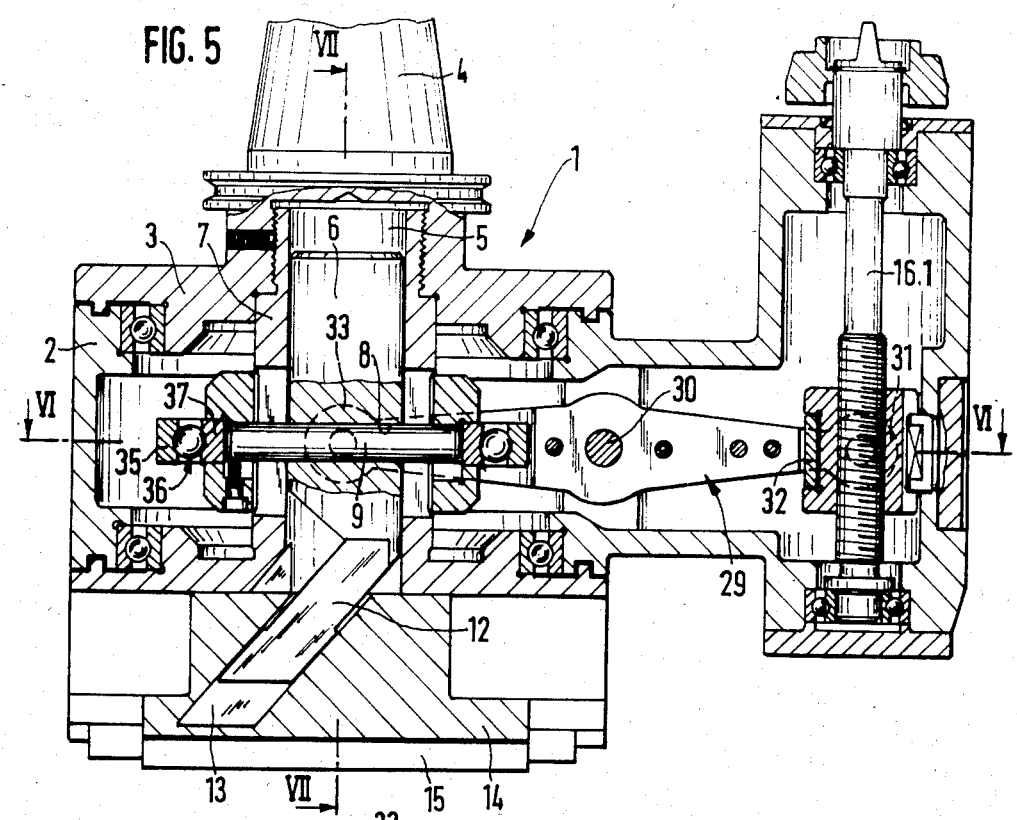
FIG. 5 is a sectional view of the turning head comprising another drive mechanism.
Figure 6:
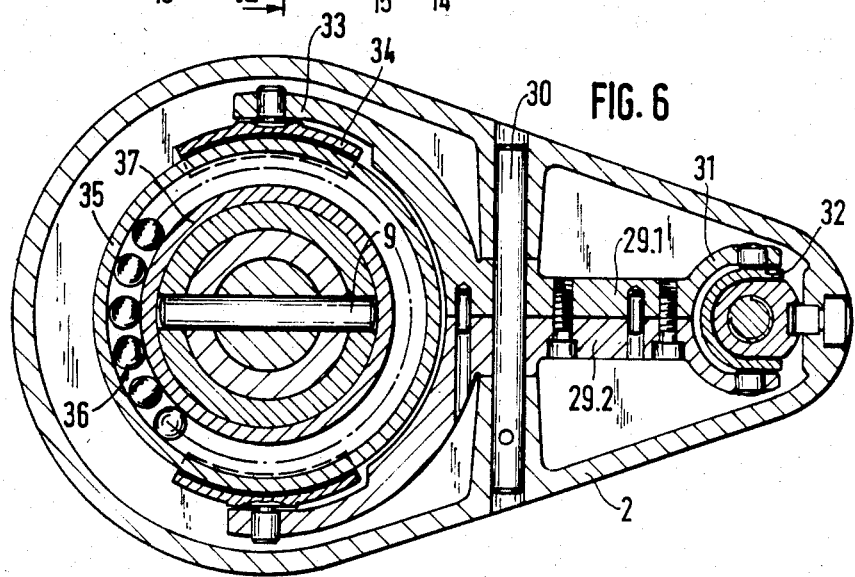
FIG. 6 is a sectional view taken along the line VI—VI of FIG. 5.

FIGS. 5,6, and 7 show another embodiment of the mechanism for moving tool slide 14 transversely. The rotary drive of turning head 1 is substantially the same as in the embodiment of FIGS. 1 to 4, but the transmission from the lateral drive shaft is different. The laterally spaced apart shaft 16.1 drives a two-armed lever 29 which is mounted in housing 2 for pivoting about a pin 30. Two-armed lever 29 is assembled of two symmetrical parts 29.1, 29.2 which are pinned or screwed together.

By a semicircular fork end, one arm 31 of the lever slidingly embraces parallel jaws 32 which are operatively connected to shaft 16.1, for example through a worm gear. A rotary motion of shaft 16.1 thus causes pivoting up and down of lever arms 31 and 33. Lever arm 33 also terminates by a semicircular fork end embracing parallel slide jaws 34 through which it is operatively connected to the outer bearing shell 35 of antifriction bearing 36, so that an axial movement of lever arm 33 takes setting rod 6 along in the same direction. The rotary motion of setting rod 6 is made possible by inner bearing shell 37 of antifriction bearing 36, and by bolt 9 received in cross bore 8. The function of gib key 12 in tool slide 14 and the mechanism for equilizing the centrifugal forces through blocks 28, pinions 26, and teeth 24 of portion 23 of tool slide 14, are the same as in the embodiment of FIGS. 1 to 4.

The advantages of the inventive turning head may be summarized as follows:

Little play, small number of transmission elements, few component parts, guideways without backlash, and balanced run with equilibrated centrifugal forces.

The inventive turning heads are particularly suitable for NC-lathes and machining stations. They may further be employed in drill head change centers, multi-spindle heads and thread cutting machines.

While specific embodiments of the invention have been shown and described in detail to illustrate the application of the principles of the invention, it will be understood that the invention may be embodied otherwise without departing from such principles.

What is claimed is:

1. A turning head, particularly a face turning head for a spindle of a machine tool, comprising a housing, a rotating part having an axis and rotatably mounted to said housing, said rotating part including a setting rod receiving bore and being axially fixed to said housing, a setting rod movable in said bore in axial directions, a tool slide movably mounted to one axial end of said rotating part, said rotating part having a slideway extending transversely to the axis of said rotating part, said tool slide being movable in said slideway and having a keyway extending at an angle to the axis of said rotating part, said setting rod having a jib key part extending into said keyway and moving said slide upon axial motion of said setting rod, a conical intermediate piece fixed to and extending from an opposite axial end of said rotating part, said intermediate piece being axially aligned with the axis of said rotating part, a drive shaft extending substantially parallel to and being radially spaced from the axis of said rotating part, said drive shaft being mounted for rotation to said housing, an inner bearing shell fixed to said setting rod for axial and rotational motion therewith, said inner bearing shell being rotatably fixed to said rotating part for co-rotation with said rotating part and being axially movable with respect to said rotating part, an outer bearing shell rotatably mounted and axially fixed to said inner bearing shell, said outer bearing shell being rotatable with respect to said setting rod, means engaged between said outer bearing shell and said housing for rotationally fixing said outer bearing shell to said housing while permitting axial motion of said outer bearing shell with respect to said housing, transmission means connected between said drive shaft and said outer bearing shell for moving said outer bearing shell axially and independently of said rotating part and for transmitting rotation of said driving shaft into axial motion of said outer bearing shell and thus of said setting rod, a block mass movably connected to said rotating part near said one axial end thereof, and means connected to said block mass and said tool slide to shift said block mass in respect of opposite directions to said slide for counterbalancing centrifugal forces during rotation of said rotating part.

2. A turning head according to claim 1, wherein said transmission means connected between said drive shaft and said outer bearing shell includes a driving pinion connected to said drive shaft, an outer wheel threaded to said outer bearing shell for axial motion on said outer bearing shell with relative rotation between said outer bearing shell and said wheel, a cog belt connected between said driving pinion and said outer wheel for rotating said outer wheel with rotation of said drive shaft, and means engaged between said outer wheel and said housing for axially fixing said outer wheel to said housing while permitting rotation of said outer wheel with respect to said housing.

3. A turning head according to claim 1, wherein said transmission means connected between said drive shaft and said outer bearing shell comprises a two armed lever pivotally connected to said housing and having a first lever arm operatively connected to said drive shaft and a second arm portion operatively connected to said outer bearing shell.

4. A turning head according to claim 3, wherein said two armed lever comprises two parts which are secured together.

5. A turning head according to claim 3, wherein said two armed lever is operatively connected to both said drive shaft and said outer bearing shell through parallel slide jaws.

6. A turning head according to claim 1, wherein said tool slide has a stud portion projecting towards said setting rod and extending parallel to said tool slide, said means for shifting said block including setting rollers with an outer gear rim engaged in said teeth, so that rotation of said rollers effect movement of said block mass.

* * * * *